United States Patent Office 2,820,034
Patented Jan. 14, 1958

2,820,034

ORGANIC COMPOUNDS

Fred Kagan, Kalamazoo Township, Kalamazoo County, Mich., assignor to The Upjohn Company, Kalamazoo, Mich., a corporation of Michigan No Drawing. Application August 16, 1955
Serial No. 528,808

4 Claims. (Cl. 260—256.4)

This invention relates to new organic compounds and is particularly directed to 2-[(2-dimethylaminoethyl)(p-methoxybenzyl)amino]pyrimidine N-oxide either as the free base or as an acid addition salt thereof.

It is an object of the invention to provide novel physiologically active compounds. It is a further object to provide novel antihistaminics. It is a further object to provide novel compounds which are safe and effective for this purpose and have a higher therapeutic index than the corresponding tertiary amine.

These and other objects are accomplished in the novel compounds of the invention which are represented by the following basic formula:

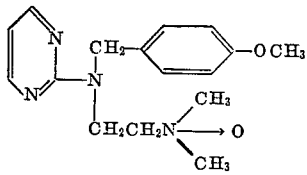

and can exist and can be used for the purposes of the invention in the form of the free base or an acid addition salt thereof with a pharmacologically acceptable acid such as hydrochloric, hydrobromic, hydriodic, sulfuric, phosphoric, nitric, acetic, benzoic, salicylic, glycolic, succinic, nicotinic, tartaric, maleic, malic, lactic acids, and the like.

The invention may be more fully understood by the following examples which are illustrative only and not to be construed as limiting.

Example 1.—2-[(2-dimethylaminoethyl)(p-methoxybenzyl)-amino]pyrimidine N-oxide free base 2 - [(2 - dimethylaminoethyl)(p - methoxybenzyl)amino]pyrimidine (0.1 mole) in ethanol was mixed with thirty milliliters of thirty percent hydrogen peroxide and the reaction mixture was stored at room temperature for five days. Excess peroxide was destroyed with platinum oxide, the catalyst was removed by filtration, and the filtrate was concentrated. 2-[(2-dimethylaminoethyl)(p-methoxybenzyl)amino]pyrimidine N-oxide free base was thus obtained as a syrup.

Example 2.—2-[(2-dimethylaminoethyl)(p-methoxybenzyl)amino]pyrimidine N-oxide dihydrobromide An ethanol solution of the product of Example 1 was saturated with dry hydrogen bromide. Ether was added until incipient turbidity appeared. The mixture was then cooled and a solid precipitated. This solid, 2-[(2-dimethylaminoethyl)(p-methoxybenzyl)amino]pyrimidine N-oxide dihydrobromide, was recovered and recrystallized from absolute ethanol; melting point 144.5–145.5 degrees centigrade.

Analysis.—Calcd. for $C_{16}H_{24}Br_2N_4O_2$: C, 41.39; H, 5.21; N, 12.07; Br, 34.43. Found: C, 41.42; H, 5.20; N, 11.80; Br, 34.47.

In place of hydrobromic acid there may be substituted appropriate acids to obtain the hydrochloride, the hydroiodide, the sulfate, the phosphate, the nitrate, the acetate, the benzoate, the salicylate, the glycolate, the succinate, the nicotinate, the tartrate, the maleate, the malate, the lactate, and the like.

The novel compounds of this invention can be used for the same purposes and in the same dosage forms, such as tablets, injectables, and elixirs, as 2-[(2-dimethylaminoethyl)(p-methoxybenzyl)amino]pyrimidine and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the class consisting of 2-[(2 - dimethylaminoethyl)(p - methoxybenzyl)amino]pyrimidine N-oxide and the acid addition salts thereof of pharmacologically acceptable acids.

2. 2 - [(2 - dimethylaminoethyl)(p - methoxybenzyl)-amino]pyrimidine N-oxide free base.

3. 2 - [(2 - dimethylaminoethyl)(p - methoxybenzyl)-amino]pyrimidine N-oxide acid addition salt of a pharmacologically acceptable acid.

4. 2 - [(2 - dimethylaminoethyl)(p - methoxybenzyl)-amino]pyrimidine N-oxide dihydrobromide.

References Cited in the file of this patent
UNITED STATES PATENTS 2,465,865    Friedman et al. _____ Mar. 29, 1949

OTHER REFERENCES

Idson: Chem. Rev. 47, 379 and 437 (1950).